(12) United States Patent
Suzuki

(10) Patent No.: US 7,782,000 B2
(45) Date of Patent: Aug. 24, 2010

(54) MOTOR CONTROLLER AND ELECTRIC POWER STEERING APPARATUS

(75) Inventor: Hiroshi Suzuki, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 235 days.

(21) Appl. No.: 12/128,304

(22) Filed: May 28, 2008

(65) Prior Publication Data

US 2008/0297958 A1    Dec. 4, 2008

(30) Foreign Application Priority Data

Jun. 1, 2007    (JP) .............................. 2007-147188

(51) Int. Cl.
*H02P 21/00* (2006.01)
*B62D 5/04* (2006.01)
(52) U.S. Cl. .................... 318/434; 318/400.02; 701/41; 180/443
(58) Field of Classification Search ................. 318/700, 318/400.01, 400.02, 430, 432, 434; 701/41; 180/443
See application file for complete search history.

(56) References Cited

U.S. PATENT DOCUMENTS

| | | | |
|---|---|---|---|
| 4,697,130 A | 9/1987 | Dadpey et al. | |
| 5,365,153 A | 11/1994 | Fujita et al. | |
| 5,689,170 A | 11/1997 | Ishikawa | |
| 5,752,209 A | 5/1998 | Nishimoto et al. | |
| 6,037,741 A | 3/2000 | Yamada et al. | |
| 6,297,574 B1 * | 10/2001 | Schob et al. | 310/90.5 |
| 6,456,946 B1 | 9/2002 | O'Gorman | |
| 6,504,336 B2 * | 1/2003 | Sakamaki | 318/727 |
| 6,639,379 B2 | 10/2003 | Matsushita et al. | |
| 6,741,060 B2 | 5/2004 | Krefta et al. | |
| 6,927,548 B2 | 8/2005 | Nishizaki et al. | |

(Continued)

FOREIGN PATENT DOCUMENTS

EP    1 737 116 A1    12/2006

(Continued)

OTHER PUBLICATIONS

U.S. Appl. No. 12/036,670, filed Feb. 25, 2008, Suzuki.

(Continued)

*Primary Examiner*—Walter Benson
*Assistant Examiner*—Eduardo Colon-Santana
(74) *Attorney, Agent, or Firm*—Oblon, Spivak, McClelland, Maier & Neustadt, L.L.P.

(57) ABSTRACT

When a failure of an electric current flow occurs in any one of phases, a microcomputer calculates a d-axis current command value that changes along a tangent curve with predetermined rotation angles as asymptotic lines. The microcomputer continuously outputs a motor control signal using two phases other than the phase with the failed electric current as electric current flowing phases by performing current feedback control in correspondence with the d-axis current command value. In such two-phase drive operation, the microcomputer calculates the d-axis current command value and a q-axis current command value in such a manner that the phase current values of the electric current flowing phases become constant at respective maximum values of flowable electric currents, which are set for the phases, in rotation angle restriction ranges in which the phase current values need to be restricted in correspondence with the maximum values, or electric current restriction ranges.

3 Claims, 9 Drawing Sheets

U.S. PATENT DOCUMENTS

| | | |
|---|---|---|
| 7,005,822 B1 | 2/2006 | O'Gorman et al. |
| 7,084,601 B2 | 8/2006 | Maeda et al. |
| 7,091,684 B2 | 8/2006 | Kobayashi et al. |
| 7,141,948 B2 | 11/2006 | Kifuku et al. |
| 7,161,317 B2 * | 1/2007 | Matsushita et al. .......... 318/432 |
| 7,161,323 B2 | 1/2007 | Ajima et al. |
| 7,188,702 B2 | 3/2007 | Takagi et al. |
| 7,193,388 B1 | 3/2007 | Skinner et al. |
| 7,240,761 B2 | 7/2007 | Nagase et al. |
| 7,298,109 B2 * | 11/2007 | Sakamaki et al. ........... 318/489 |
| 7,321,216 B2 | 1/2008 | Suzuki |
| 7,348,756 B2 | 3/2008 | Ma et al. |
| 7,394,214 B2 | 7/2008 | Endo et al. |
| 7,414,425 B2 | 8/2008 | O'Gorman et al. |
| 7,439,693 B2 | 10/2008 | Shoda et al. |
| 7,474,067 B2 | 1/2009 | Ueda et al. |
| 2002/0145837 A1 | 10/2002 | Krefta et al. |
| 2005/0125124 A1* | 6/2005 | Nagase et al. ................. 701/41 |
| 2006/0022626 A1* | 2/2006 | Kobayashi et al. .......... 318/432 |
| 2008/0185983 A1 | 2/2008 | Suzuki |
| 2008/0067960 A1 | 3/2008 | Maeda et al. |
| 2009/0192665 A1* | 7/2009 | Nozawa ....................... 701/29 |

FOREIGN PATENT DOCUMENTS

| | | |
|---|---|---|
| JP | 2003-26020 | 1/2003 |
| JP | 2006-67731 | 3/2006 |

OTHER PUBLICATIONS

U.S. Appl. No. 12/036,614, filed Feb. 25, 2008, Suzuki.
U.S. Appl. No. 12/036,733, filed Feb. 25, 2008, Suzuki.
U.S. Appl. No. 12/139,054, filed Jun. 13, 2008, Suzuki.
U.S. Appl. No. 12/209,524, filed Sep. 12, 2008, Suzuki.
U.S. Appl. No. 12/212,165, filed Sep. 17, 2008, Suzuki.
USPTO Office Action for co-pending application 12/036,670, Apr. 5, 2010, 19 pages.
USPTO Qualye Office Action for co-pending application 12/036,614, May 25, 2010, 17 pages.
Notice of Allowance dated May 25, 2010, in U.S. Appl. No. 12/036,733.

* cited by examiner

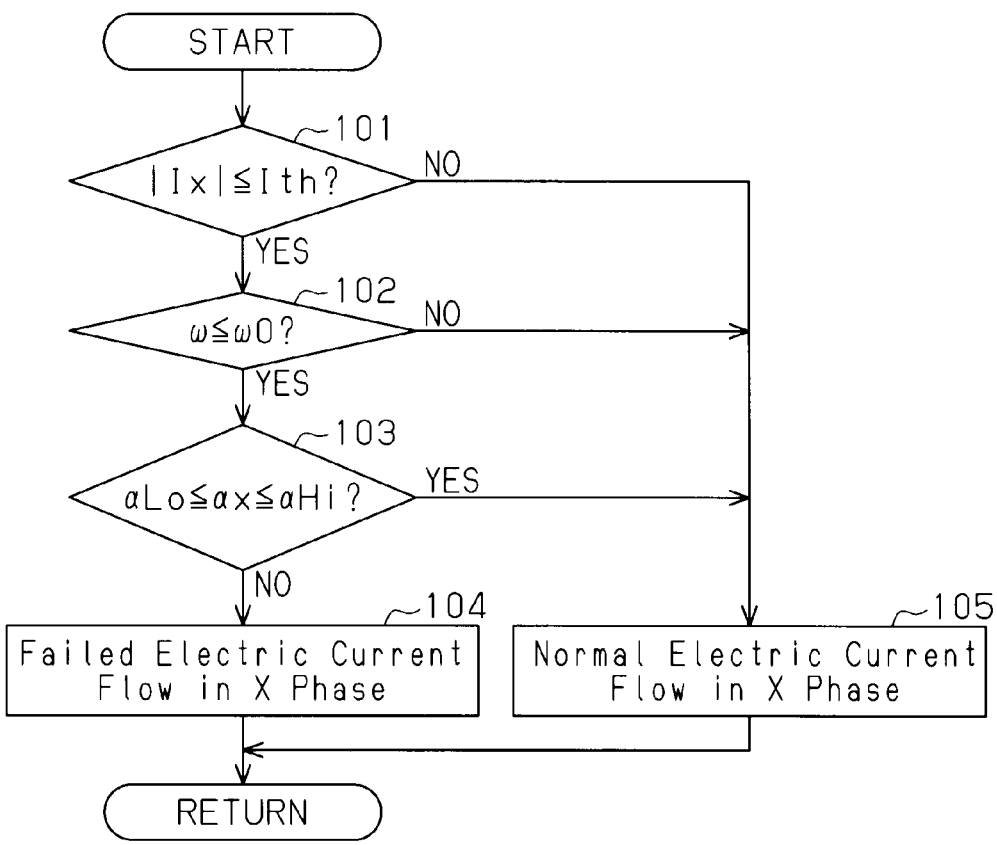
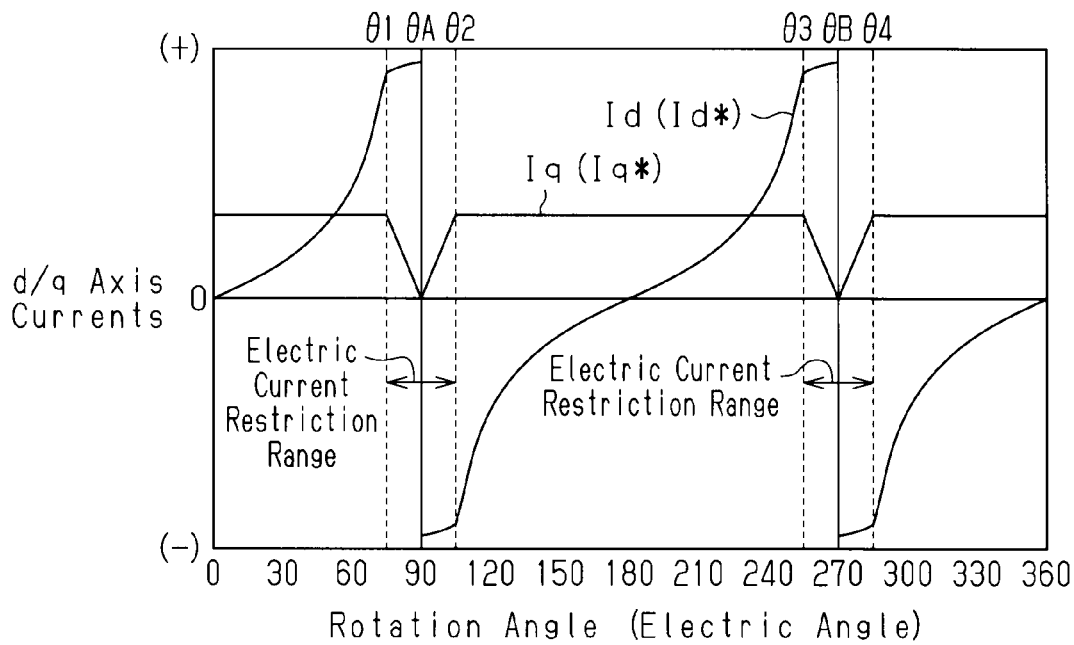

Electric Current Flow Failed in U Phase

Electric Current Flow Failed in V Phase

US 7,782,000 B2

MOTOR CONTROLLER AND ELECTRIC POWER STEERING APPARATUS

This application is based on and claims priority from Japanese Patent Application No. 2007-147188 filed on Jun. 1, 2007, the entire contents of which are incorporated herein by reference.

BACKGROUND OF THE INVENTION

The present invention relates to a motor controller and an electric power steering apparatus.

In many cases, conventional motor controllers used, for example, in electric power steering apparatuses (EPS) include anomaly detecting means. The anomaly detecting means detects an anomaly when flow of electric current fails in any one of U, V, and W phases, due to a break in power supply lines or damage to contacts of a driver circuit. When such an anomaly is detected, control of operation of a motor is quickly stopped and thus fail safe is performed.

However, in the EPS, if the control of the operation of the motor is suspended, the steering characteristics are greatly changed. Specifically, increased steering force becomes necessary for the driver to accurately manipulate a steering wheel. In this regard, Japanese Laid-Open Patent Publication No. 2003-26020, for example, discloses a motor controller that, even if a failure of electric current flow is detected in a certain phase, continuously controls the operation of a motor by employing two phases free of failure of electric current flow as electric current flowing phases. In this manner, assist force is continuously applied to a steering system, thus preventing increase of load on the driver caused by the failsafe.

However, with reference to FIG. 15, if a sinusoidal electric current is supplied to each one of the electric current flowing phases in the above-described conventional case, a torque ripple is caused and thus steering comfort decreases. FIG. 15 illustrates an example in which the electric current flow has failed in the U phase while normal electric current flows are ensured in the V and W phases.

Specifically, as illustrated in FIG. 16, if change of a motor electric current in conventional two-phase drive operation is represented in a d/q coordinate system, a q-axis current command value, which is a target control value of motor torque, remains constant. However, an actual q-axis current value changes in accordance with a sinusoidal wave. In other words, the generated motor electric current does not correspond to requested torque. The motor is thus continuously operated without achieving its full output performance.

Further, as disclosed in Japanese Laid-Open Patent Publication No. 2006-67731, anomaly of a control system, such as generation of an overcurrent caused by a failed driver circuit or a problem of a sensor, is detected through comparison between an electric current deviation (a q-axis current deviation, mainly) of a d/q coordinate system and a predetermined threshold value. However, in the above-described two-phase drive operation, the electric current values of the d-q coordinate system each change in accordance with a sinusoidal wave. The electric current deviation is thus caused regardless of whether there is an anomaly. As a result, such anomaly cannot be detected in the two-phase drive operation.

SUMMARY OF THE INVENTION

Accordingly, it is an objective of the present invention to provide a motor controller and an electric power steering apparatus that detect an anomaly with high accuracy while effectively suppressing generation of a torque ripple in two-phase drive operation, which is performed if an electric current flow fails in any one of phases.

To achieve the foregoing objective and in accordance with a first aspect of the present invention, a motor controller having signal output means that outputs a motor control signal and a driver circuit that supplies a three-phase drive power to a motor based on the motor control signal is provided. The signal output means includes calculating means that calculates a d-axis current command value and a q-axis current command value of a d/q coordinate system as electric current command values, signal generating means that generates the motor control signal by performing current feedback control of the d/q coordinate system based on the d-axis current command value and the q-axis current command value, and anomaly detecting means that is capable of detecting a failed electric current flow in any one of the phases of the motor. When a failed electric current flow is detected, the signal output means outputs the motor control signal using two phases other than the phase with the failed electric current flow as electric current flowing phases. A maximum value of an electric current flowable in each of the phases of the motor is set for each of phase current values of the motor. When a failed electric current flow occurs, the calculating means calculates the d-axis current command value changing along a tangent curve with a predetermined rotation angle corresponding to the phase with the failed electric current flow as an asymptotic line, and calculates the d-axis current command value and the q-axis current command value in such a manner that the phase current value of each of the electric current flowing phases becomes constant at the maximum value in a rotating angle range in which the phase current value needs to be restricted based on the maximum value.

In accordance with a second aspect of the present invention, an electric power steering apparatus having the motor controller according to the first aspect of the present invention is provided.

BRIEF DESCRIPTION OF THE DRAWINGS

FIG. 3 is a flowchart representing a procedure for detecting a phase with a failed electric current flow;

FIG. 4 is a graph representing changes of d/q axis currents in two-phase drive operation (when the electric current flow in the U phase has failed);

DETAILED DESCRIPTION OF THE PREFERRED EMBODIMENTS

An embodiment of the present invention, which is an electric power steering apparatus (an EPS), will now be described with reference to the attached drawings.

Figure 1:
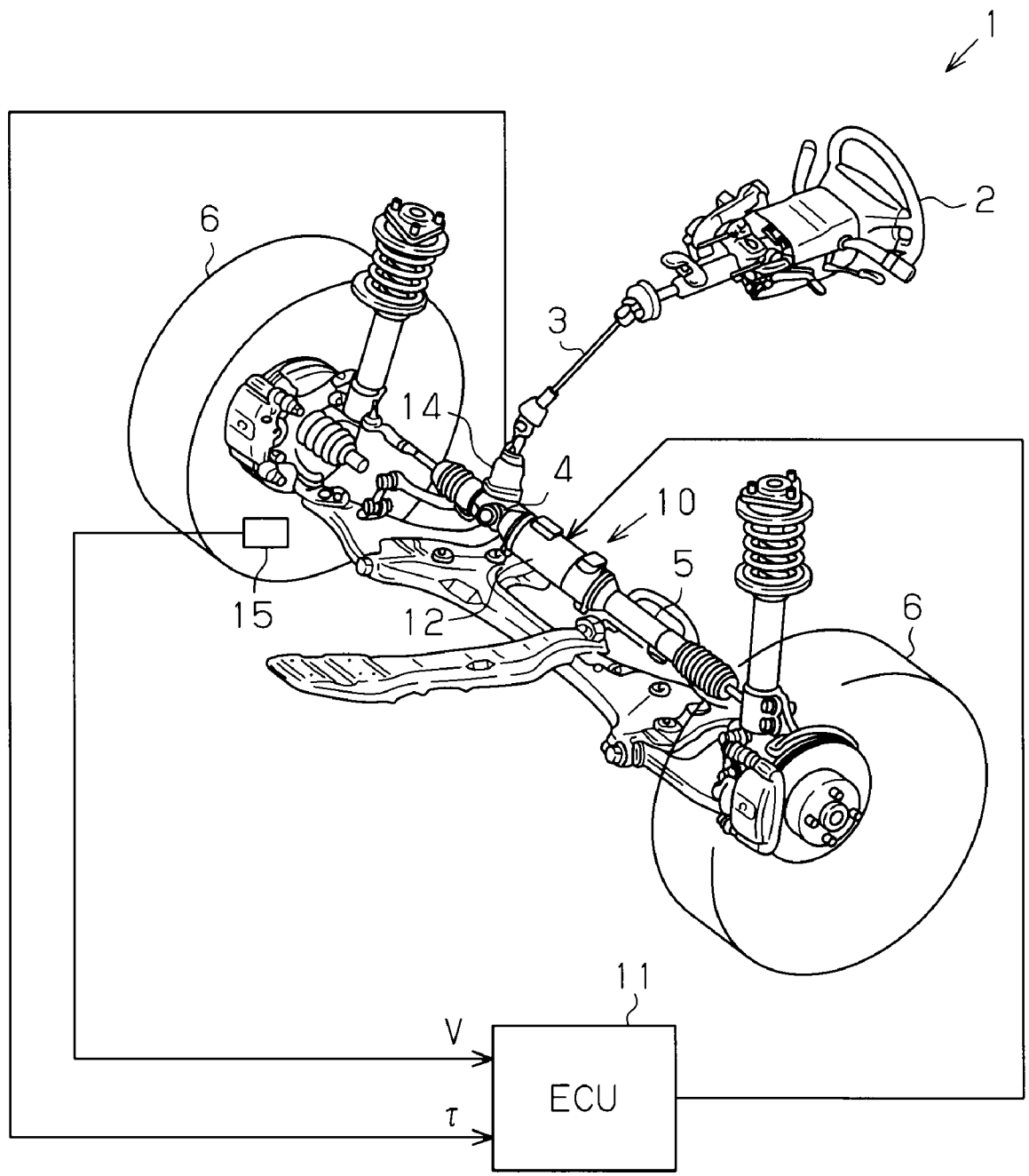
FIG. 1 is a perspective view schematically showing an electric power steering apparatus (EPS)

As shown in FIG. 1, a steering wheel 2 is fixed to a steering shaft 3. The steering shaft 3 is connected to a rack 5 through a rack-and-pinion mechanism 4. The steering shaft 3 is rotated through steering. The rotation of the steering shaft 3 is converted into linear reciprocation of the rack 5 through the rack-and-pinion mechanism 4. This changes steering angles of steering wheels 6.

An EPS 1 has an EPS actuator 10 and an ECU 11. The EPS actuator 10 is a steering force assisting device that applies assist force to a steering system in order to assist steering. The ECU 11 is control means that controls operation of the EPS actuator 10.

The EPS actuator 10 is a rack type EPS actuator and is powered by a motor 12, or a drive source, which is arranged coaxially with the rack 5. In the EPS actuator 10, the motor 12 generates assist torque, which is transmitted to the rack 5 through a ball screw mechanism (not shown). The motor 12 is a brushless type and driven by three-phase (U, V, and W phases) drive power supplied from the ECU 11. The ECU 11 as a motor controller adjusts the assist force applied to the steering system by regulating the assist torque produced by the motor 12 (power assist control).

A torque sensor 14 and a vehicle speed sensor 15 are connected to the ECU 11. The ECU 11 operates the EPS actuator 10, or carries out the power assist control, based on a steering torque τ and a vehicle speed V, which are detected by the torque sensor 14 and the vehicle speed sensor 15, respectively.

The electrical configuration of the EPS 1 according to the illustrated embodiment will hereafter be explained.

Figure 2:
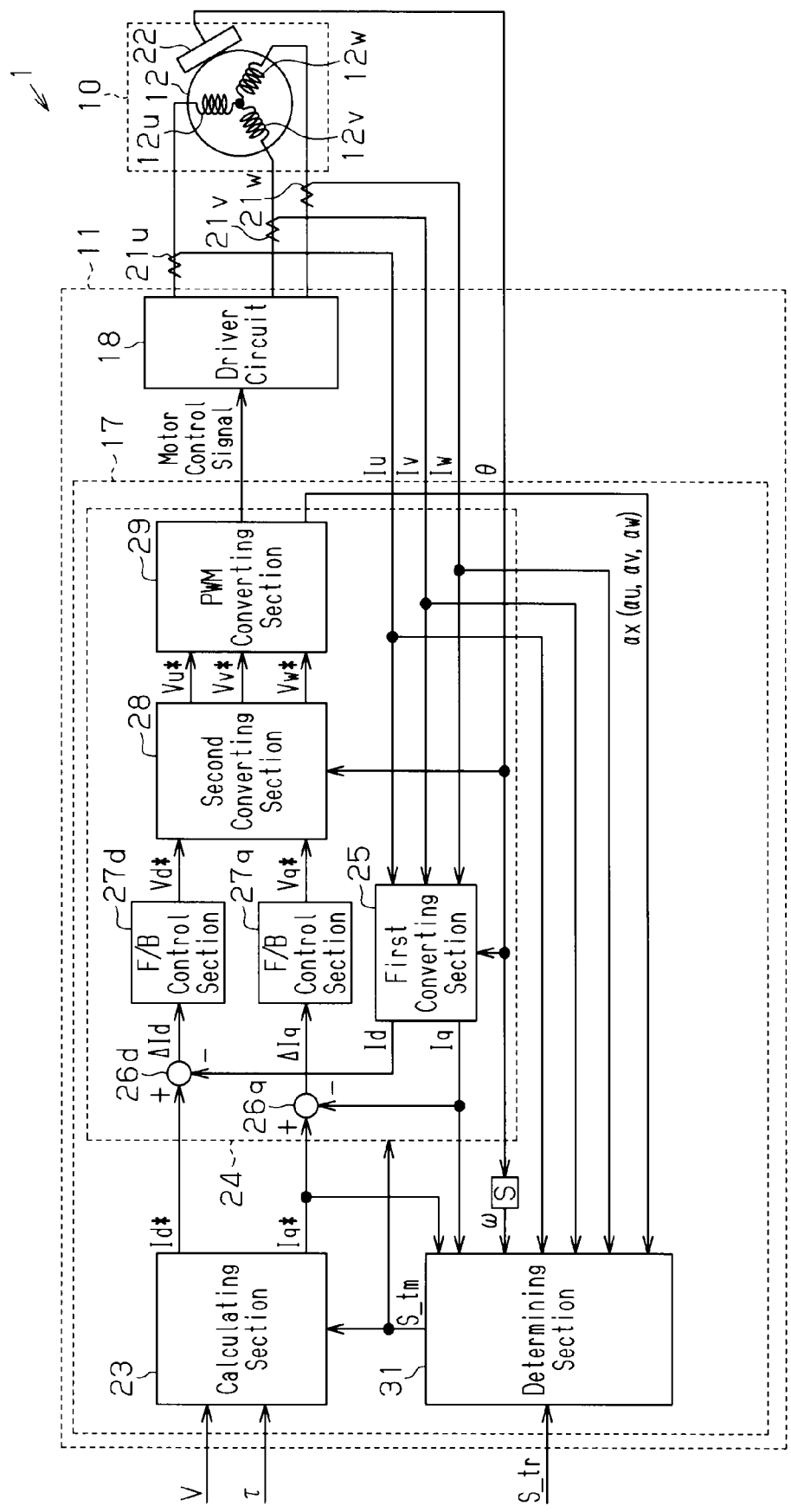
FIG. 2 is a block diagram representing the electric configuration of the EPS.

As illustrated in FIG. 2, the ECU 11 has a microcomputer 17 and a driver circuit 18. The microcomputer 17 is signal output means that outputs a motor control signal. The driver circuit 18 supplies the three-phase power to the motor 12 based on the motor control signal.

The driver circuit 18 is a publicly known PWM inverter that is configured by connecting three basic units (arms) corresponding to the respective phases in parallel. Each of the basic units is formed by a pair of switching elements that are connected in series. The motor control signal, which is output by the microcomputer 17, defines ON duty ratio of each of the switching elements, which form the driver circuit 18. When the motor control signal is provided to the gate terminal of each switching element, the switching element is turned selectively on and off in response to the motor control signal. This converts DC voltage of a power source (not shown) mounted in the vehicle to the three-phase (U, V, and W phases) drive power. The drive power is then supplied to the motor 12.

The ECU 11 has electric current sensors 21u, 21v, and 21w, which detect phase current values Iu, Iv, and Iw, respectively, and a rotation angle sensor 22 detecting a rotation angle θ of the motor 12. Based on the phase current values Iu, Iv, Iw and the rotation angle θ of the motor 12, which are detected based on detection signals of these sensors, and the steering torque τ and the vehicle speed V, the microcomputer 17 outputs the motor control signal to the driver circuit 18.

The microcomputer 17 includes a calculating section 23 serving a calculating means and a signal generating section 24 serving as signal generating means. The calculating section 23 calculates an electric current command value as a target control amount of the assist force applied to the steering system. The signal generating section 24 generates the motor control signal based on the electric current command value, which is provided by the calculating section 23.

The calculating section 23 calculates a d-axis current command value Id* and a q-axis current command value Iq* based on the steering torque τ and the vehicle speed V, which are detected by the torque sensor 14 and the vehicle speed sensor 15, respectively. The calculating section 23 then outputs the obtained d-axis current command value Id* and q-axis current command value Iq* to the signal generating section 24. Along with the d-axis current command value Id* and the q-axis current command value Iq*, which are provided by the calculating section 23, the signal generating section 24 receives the phase current values Iu, Iv, Iw detected by the corresponding electric current sensors 21u, 21v, 21w and the rotation angle θ detected by the rotation angle sensor 22. Based on the phase current values Iu, Iv, Iw and the rotation angle θ (the electric angle), the signal generating section 24 generates the motor control signal by performing feedback control on electric currents in the d-q coordinate system.

Specifically, in the signal generating section 24, the phase current values Iu, Iv, Iw are input to the first converting section 25 serving as a three phase/two phase converting section, together with the rotation angle θ. The first converting section 25 converts the phase current values Iu, Iv, Iw into a d-axis current value Id and a q-axis current value Iq of a d/q coordinate system. A d-axis current command value Id* and a q-axis current command value Iq*, which are output by the calculating section 23, are input to a subtractor 26d and a subtractor 26q, respectively, together with the corresponding one of the d-axis current value Id and the q-axis current value Iq. In normal control, the calculating section 23 outputs "0" as the d-axis current command value Id* (Id*=0).

A d-axis current deviation ΔId, which is calculated by the subtractor 26d, is sent to a F/B control section 27d. Also, a q-axis current deviation ΔIq, which is obtained by the subtractor 26q, is input to a F/B control section 27q. The F/B control section 27*d* performs feedback control for causing the d-axis current value Id, which represents the actual electric current, to follow the the d-axis current command value Id* output from the calculating section 23. Similarly, the F/B control section 27*q* carries out feedback control for causing the q-axis current value Iq, which represents the actual electric current, to follow the q-axis current command value Iq* output from the calculating section 23.

Specifically, the F/B control section 27*d* obtains a d-axis voltage command value Vd* by multiplying the d-axis current deviation ΔId by a predetermined F/B gain (PI gain). The F/B control section 27*q* determines a q-axis voltage command value Vq* by multiplying the q-axis current deviation ΔIq by a predetermined F/B gain (PI gain). The d-axis voltage command value Vd* and the q-axis voltage command value Vq*, which are provided by the F/B control section 27*d* and the F/B control section 27*q*, respectively, are input to a second converting section 28, which is a two phase/three phase converting section 28, along with the rotation angle θ. The second converting section 28 converts the d-axis and q-axis voltage command values Vd*, Vq* into three phase voltage command values Vu*, Vv*, Vw*.

The voltage command values Vu*, Vv*, Vw* are input to a PWM converting section 29. The PWM converting section 29 generates duty command values αu, αv, αw corresponding to the voltage command values Vu*, Vv*, Vw*. The signal generating section 24 produces a motor control signal having an ON duty ratio represented by each of the duty command values αu, αv, αw. The microcomputer 17 outputs the motor control signal to (the gate terminals of) the switching terminals forming the driver circuit 18. In this manner, the microcomputer 17 controls operation of the driver circuit 18, or supply of drive power to the motor 12.

[Control When Anomaly Occurs]

As illustrated in FIG. 2, the microcomputer 17 of the ECU 11 has a determining section 31 that identifies the type of an anomaly if any anomaly occurs in the EPS 1. The ECU 11 (the microcomputer 17) changes control modes of the motor 12 in correspondence with the type of the anomaly identified by the determining section 31.

Specifically, the determining section 31 receives an anomaly signal S_tr for detecting an anomaly in the mechanical structure of the EPS actuator 10. In response to the anomaly signal S_tr, the determining section 31 detects an anomaly in the mechanical system of the EPS 1. The determining section 31 also receives the q-axis current command value Iq*, the q-axis current value Iq, the phase current values Iu, Iv, Iw, and the rotation angular velocity ω of the motor 12 and the duty command values αu, αv, αw of the respective phases. Based on the respective condition amounts, the determining section 31 detects the occurrence of an anomaly in the control system.

More specifically, the determining section 31 monitors the q-axis current deviation ΔIq in order to detect occurrence of an anomaly in the control system as a whole, including a failure of the torque sensor 14 and that of the driver circuit 18. In other words, the determining section 31 compares the q-axis current deviation ΔIq with a predetermined threshold value. If the q-axis current deviation ΔIq remains greater than or equal to the threshold value for longer than a predetermined time, the determining section 31 determines that an anomaly has occurred in the control system.

The determining section 31 also detects a phase with a failed electric current flow caused by a break of a power line (including a motor coil) or a failed contact of the driver circuit 18 based on the phase current values Iu, Iv, Iw, the rotation angular velocity ω, and the duty command values αu, αv, αw of the respective phases. Such detection is carried out depending on whether a duty command value αx corresponding to an X phase is continuously outside a predetermined range (αLo≦α≦αHi) when a phase current value Ix of the X phase (X=U, V, W) is smaller than or equal to a predetermined value Ith (|Ix|≦Ith) and the rotation angular velocity ω is within a target range (|ω|≦ω0), in which it is determined whether a break has occurred. The predetermined range (αLo≦α≦αHi) is set as a range of values corresponding to the threshold value ω0 in accordance with which the value Ith and the target range are defined.

In this case, the value Ith, or the threshold value of the phase current value Ix, is set to a value near "0". The threshold value ω0 of the rotation angular velocity ω is set to a value corresponding to the base speed (the maximum rotation number) of the motor. The threshold values αLo and αHi of the duty command value αx are set to a value smaller than the lower limit value and a value greater than the upper limit value of the duty command value αx in normal control, respectively.

Specifically, with reference to the flowchart of FIG. 3, the determining section 31 determines whether the absolute value of the detected phase current value Ix is smaller than or equal to the value Ith (step 101). If the absolute value of the phase current value Ix is smaller than or equal to the value Ith (|Ix|≦Ith, step 101: YES), the determining section 31 determines whether the absolute value of the rotation angular velocity ω is smaller than or equal to the predetermined threshold value ω0 (step 102). If the rotation angular velocity ω is smaller than or equal to the threshold value ω0 (|ω|≦ω0, step 102), the determining section 31 determines whether the duty command value αx is in the predetermined range (αLo≦αx≦αHi, step 103). If the duty command value αx is outside the predetermined range (step 103: NO), the determining section 31 determines that the electric current flow has failed in the X phase (step 104).

If the phase current value Ix is greater than the value Ith (|Ix|>Ith, step 101: NO), the rotation angular velocity ω is greater than the threshold value ω0 (|ω|>ω0, step 102: NO), or the duty command value αx is in the aforementioned predetermined range (αLo≦αx≦αHi, step 103: YES), the determining section 31 determines that the X phase is free from a failure of electric current flow (normal functioning of the X phase determined, step 105).

That is, if a failure of electric current flow (a break) has occurred in the X phase (any one of the U, V, and W phases), the phase current value Ix of the X phase becomes "0". The phase current value Ix may become "0" or "a value near 0" in the following two cases other than the case of the break.

The rotation angular velocity of the motor reaches the base speed (the maximum rotation number).

The electric current command value is substantially "0".

Accordingly, the determining section 31 first compares the phase current value Ix of the X phase, which is an object of determination, with the predetermined value Ith so as to determine whether the phase current value Ix is "0". Then, the determining section 31 determines whether the current case corresponds to either one of the aforementioned two cases other than the case of the break, in which the phase current value Ix becomes "0" or "near 0". If the current case does not correspond to either one of the cases, the determining section 31 determines that there is a break in the X phase.

Specifically, if the duty command value αx is at an extreme level despite that the phase current value Ix is not as small as a value smaller than or equal to the value Ith, which is near zero, the determining section 31 determines that a failure of electric current flow has occurred in the X phase. In the illustrated embodiment, the determining section 31 identifies the phase in which the failure of electric current flow has occurred by carrying out the above-described determination for the respective ones of the U, V, and W phases.

Although omitted from the flowchart of FIG. 3 for the illustrative purposes, the determining section 31 carries out such determination only when the voltage of the power source is greater than or equal to a specified voltage necessary for driving the motor 12. The determining section 31 eventually determines that an anomaly has been detected depending on whether determination that the failure of electric current flow has occurred lasts a predetermined period of time in a prescribed step 104.

The ECU 11 (the microcomputer 17) switches the control modes of the motor 12 in accordance with the result of determination by the determining section 31. Specifically, the determining section 31 outputs the result of the determination including detection of the failure of electric current flow as an anomaly detection signal S_tm. Then, the calculating section 23 calculates the electric current command values corresponding to the anomaly detection signal S_tm, and the signal generating section 24 generates a motor control signal. In this manner, the microcomputer 17 switches the control modes of the motor 12 from one to another.

More specifically, the ECU 11 has three control modes. The control modes are a "normal control mode" for a normal state, an "assist suspension mode" for when an anomaly has been caused and thus the motor 12 must be stopped, and a "two-phase drive mode" for when a failure of electric current flow has occurred in any one of the phases of the motor 12. If the anomaly detection signal S_tm corresponds to the "normal control mode", the calculating section 23 calculates the d-axis current command value Id* and the q-axis current command value Iq* for the normal state. The signal generating section 24 generates the motor control signal correspondingly.

If the anomaly detection signal S_tm corresponds to the "assist suspension mode", the calculating section 23 calculates the d-axis current command value Id* and the q-axis current command value Iq* and the signal generating section 24 generates the motor control signal in such a manner as to stop the motor 12. The "assist suspension mode" is selected if an anomaly occurs in the mechanical system or the torque sensor 14 or if an anomaly such as generation of an overcurrent is caused in the power supply system. Further, in accordance with the "assist suspension mode", the motor 12 may be stopped immediately or after the assist force is gradually decreased by reducing the output of the motor 12. In the latter case, the calculating section 23 gradually decreases the absolute value of the q-axis current command value Iq*. After the motor 12 is deactivated, the microcomputer 17 switches the switching elements forming the driver circuit 18 to the open state and opens a non-illustrated power source relay.

The anomaly detection signal S_tm corresponding to the "two-phase drive mode" carries information that identifies the phase in which the failure of electric current flow occurred. If the anomaly detection signal S_tm corresponds to the "two-phase drive mode", the signal generating section 24 generates a motor control signal instructing to use, as electric current flowing phases, the two phases other than the phase with the failed electric current flow.

In the "two-phase drive mode", the calculating section 23 calculates the d-axis current command value Id* using the following expressions (1) to (3), in correspondence with the detected phase with the failed electric current flow:

When the electric current flow fails in the U Phase:

$$I_d^* = I_q^* \frac{\sin\theta}{\cos\theta} = I_q^* \tan\theta \qquad (1)$$

When the electric current flow fails in the V phase:

$$I_d^* = -I_q^* \frac{\sin\left(\theta + \frac{\pi}{3}\right)}{\sin\left(\theta - \frac{\pi}{6}\right)} = I_q^* \tan\left(\theta - \frac{2\pi}{3}\right) \qquad (2)$$

When the electric current flow fails in the W Phase:

$$I_d^* = -I_q^* \frac{\sin\left(\theta + \frac{\pi}{3}\right)}{\sin\left(\theta + \frac{\pi}{6}\right)} = I_q^* \tan\left(\theta + \frac{2\pi}{3}\right) \qquad (3)$$

Figure 5:
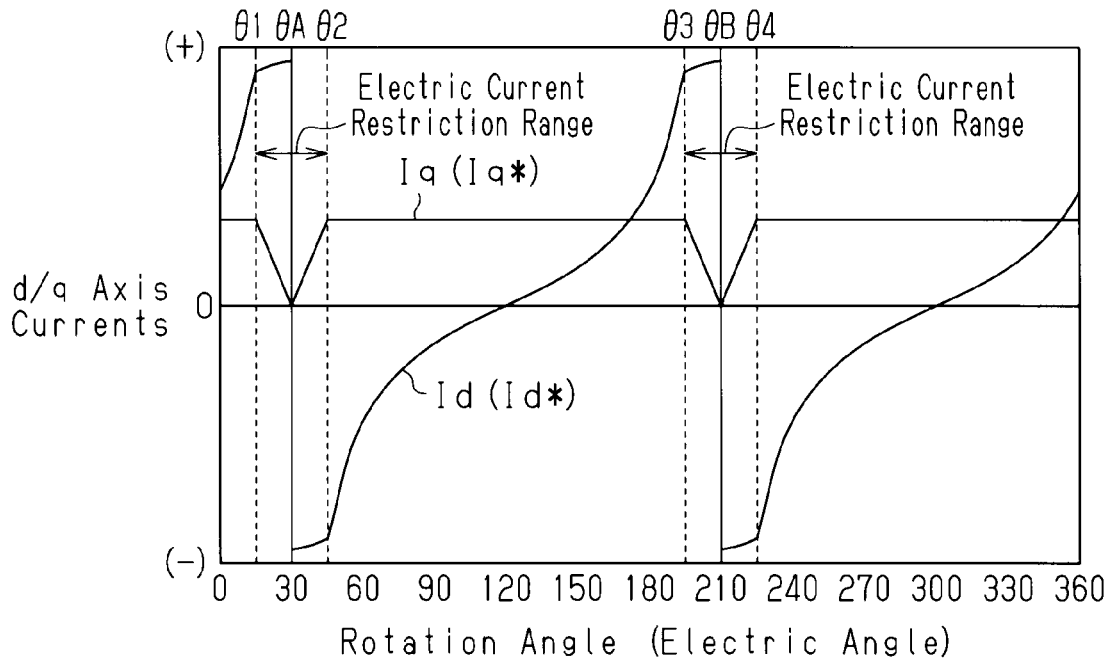
FIG. 5 is a graph representing changes of the d/q axis currents in the two-phase drive operation (when the electric current flow in the V phase has failed)
Figure 6:
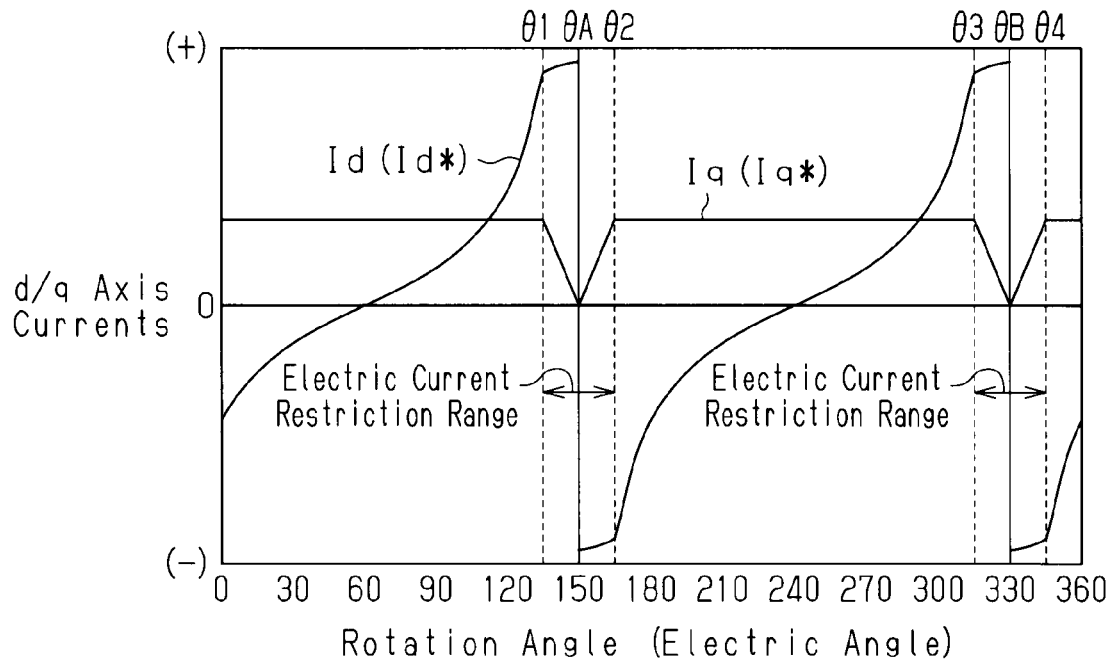
FIG. 6 is a graph representing changes of the d/q axis currents in the two-phase drive operation (when the electric current flow in the W phase has failed)

With reference to FIGS. 4 to 6, the d-axis current command value Id* is monotonically nondecreasing (when Iq*>0) or monotonically nonincreasing (when Iq*<0) with predetermined rotation angles θA, θB as asymptotic lines, in correspondence with the sign of the q-axis current command value Iq*. More specifically, the d-axis current command value Id* changes along a tangent curve (tangent: tan θ), or a tangent curve.

To facilitate the following explanation, in the range of the electric angles from 0° to 360°, the smaller one of the two rotation angles corresponding to the asymptotic lines will be referred to as the rotation angle θA and the greater one will be referred to as the rotation angle θB. As illustrated in FIG. 4, when an anomaly has occurred in the U phase and thus electric currents are introduced into the other two phases, which are the V and W phases, the rotation angle θA and the rotation angle θB are "90°" and "270°", respectively. With reference to FIG. 5, when the electric current flow in the V phase has failed, the rotation angle θA is "30°" and the rotation angle θB is "210°". With reference to FIG. 6, when the electric current flow in the W phase has failed, the rotation angle θA is "150°" and the rotation angle θB is "330°".

In calculation of the d-axis current command value Id* using the above-described expressions (1) to (3), the q-axis current command value Iq* is the same value as the q-axis current command value Iq* for the normal state, or an original value "Iq_as*" corresponding to the target value of the motor torque.

Based on the d-axis current command value Id* and the q-axis current command value Iq*, the signal generating section 24 performs current feedback control in the d/q coordinate system. In this manner, the signal generating section 24 generates a motor control signal for carrying out two-phase drive operation control using the two phases other than the phase with the failed electric current flow as the electric current flowing phases.

Figure 7:
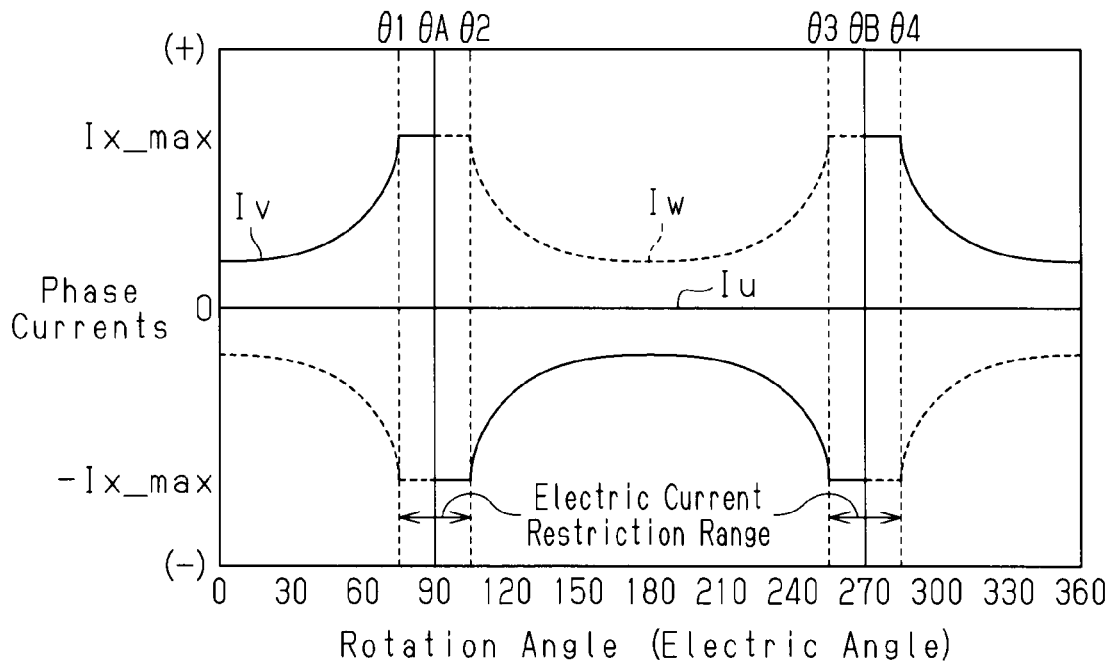
FIG. 7 is a graph representing changes of phase currents in two-phase drive operation (when the electric current flow in the U phase has failed)
Figure 8:
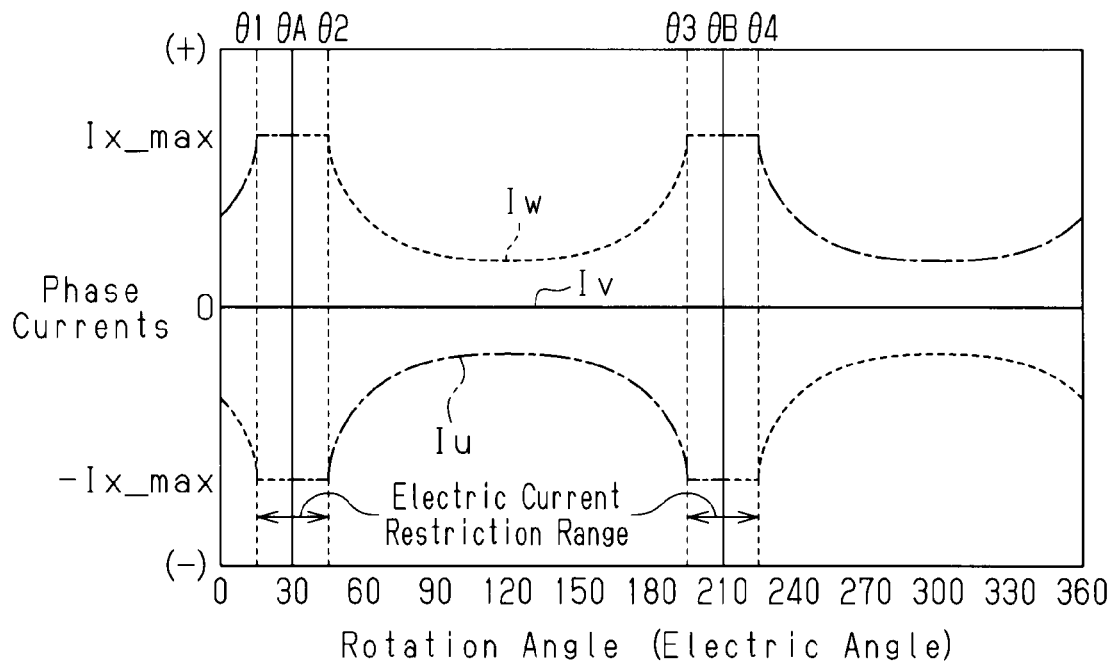
FIG. 8 is a graph representing changes of the phase currents in the two-phase drive operation (when the electric current flow in the V phase has failed)
Figure 9:
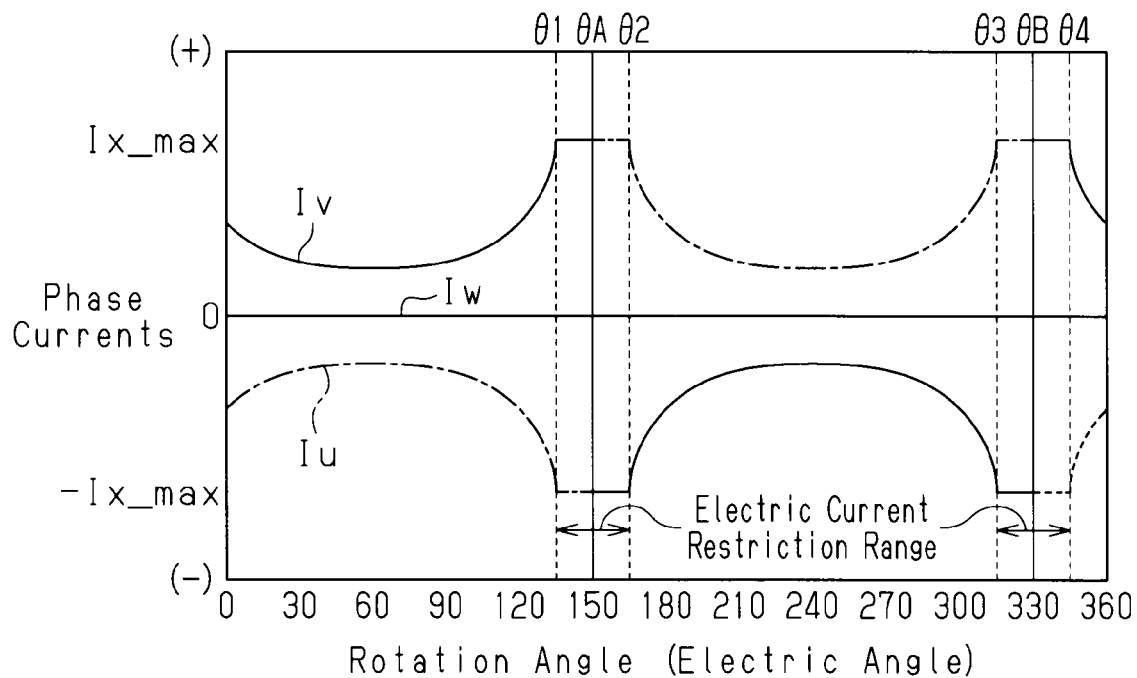
FIG. 9 is a graph representing changes of the phase currents in the two-phase drive operation (when the electric current flow in the W phase has failed)

That is, in the two-phase drive operation, the signal generating section 24 performs the current feedback control based on the d-axis current command value Id*, which changes in accordance with the tangent curve determined by the expressions (1) to (3). In this manner, as represented by the following expressions (4) to (9), a phase current changing in accordance with a secant curve or a cosecant curve with the rotation angles θA, θB as the asymptotic lines is generated in each one of the U, V, and W phases (see FIGS. 7 to 9). The phase current value of the phase with the failed electric current is "0". The secant curve corresponds to the inverse number of sin θ (cosecant: cos ecθ) and the cosecant curve corresponds to the inverse number of cos θ (secant: secθ).

When the electric current flow fails in the U phase:

$$I_v = \frac{I_q^*}{\sqrt{2}\cos\theta} \tag{4}$$

$$I_w = \frac{-I_q^*}{\sqrt{2}\cos\theta} \tag{5}$$

When the electric current flow fails in the V phase:

$$I_u = \frac{-I_q^*}{\sqrt{2}\sin\left(\theta - \frac{\pi}{6}\right)} \tag{6}$$

$$I_w = \frac{I_q^*}{\sqrt{2}\sin\left(\theta - \frac{\pi}{6}\right)} \tag{7}$$

When the electric current flow fails in the W phase:

$$I_u = \frac{-I_q^*}{\sqrt{2}\sin\left(\theta + \frac{\pi}{6}\right)} \tag{8}$$

$$I_v = \frac{I_q^*}{\sqrt{2}\sin\left(\theta + \frac{\pi}{6}\right)} \tag{9}$$

As a result, theoretically, the q-axis current value Iq that follow the q-axis current command value Iq* is generated in the d/q coordinate system, except for the values corresponding to the rotation angles θA, θB.

In other words, if the rotation angle θ of the motor 12 is not the rotation angles θA, θB, the q-axis current value Iq corresponding to the requested torque can be produced theoretically. That is, the q-axis current value Iq is generated as a value equal to the q-axis current command value Iq*, which is the target value of the motor torque. In this manner, generation of a torque ripple caused by two-phase drive operation is suppressed in such operation. Further, while maintaining improved steering comfort, assist force is continuously applied.

A maximum value Ix_max is set for the absolute values of the electric currents flowable in the motor coils 12u, 12v, 12w of the respective phases. If current feedback control is performed based on the d-axis current command value Id* changing along a tangent curve throughout the entire range of the rotation angles, a phase current exceeding the maximum value Ix_max may be produced.

Thus, in the two-phase drive operation, the calculating section 23 calculates the d-axis current command value Id* and the q-axis current command value Iq* in such a manner that the phase current values of the two phases functioning as the electric current flowing phases become smaller than or equal to an upper limit value (Ix_max) and greater than or equal to a lower limit value (-Ix_max). This ensures maximum output performance of the motor and suppresses heating of the switching elements of the driver circuit or the motor coils of the phases caused by an electric current flow exceeding the maximum value Ix_max. The motor is thus stably operated.

Specifically, if current feedback control is carried out based on the d-axis current command value Id* changing along a tangent curve throughout the entire range of the rotation angles, the calculating section 23 first determines whether the detected rotation angle θ of the motor 12 is in the range of the rotation angles in which a phase current exceeding the maximum value Ix_max is generated in the electric current flowing phases.

More specifically, the range of the rotation angles in which the value of the electric current flowing in each of the phases must be restricted is the ranges (Ix≧Ix_max, Ix≦-Ix_max) in which the phase current value becomes greater than or equal to the maximum value Ix_max. In other words, an electric current restriction range is the rotation angle range of the rotation angle θ1 to the rotation angle θ2 near the rotation angle θA corresponding to one of the asymptotic lines or the rotation angle range of the rotation angle θ3 to the rotation angle θ4 near the rotation angle θB corresponding to the other one of the asymptotic lines. Thus, by substituting the upper limit value (+Ix_max) and the lower limit value (-Ix_max) corresponding to the maximum value Ix_max into the above-described expressions (4) to (9) so as to obtain the solutions of the rotation angle θ, the four rotation angles θ1, θ2, θ3, θ4, which define the electric current restriction ranges, are identified.

That is, if the phase with the failed electric current flow is the U phase (when the electric current flow in the U phase has failed), calculation is performed using the expressions (10), (11), (12), and (13), each obtained by substituting the upper limit value and the lower limit value of the phase current value into the above-described expression (4). In this manner, one of the rotation angles θA, θB corresponding to the asymptotic lines is determined. In other words, the rotation angles θ1, θ2 defining the electric current restriction range in the proximity of the rotation angle θA are obtained.

When the electric current flow fails in the U phase:

if $I_q^* \geq 0$ $$I_v = \frac{I_q^*}{\sqrt{2}\cos\theta_1} = I_{x\_max} \quad \therefore \theta_1 = \cos^{-1}\left(\frac{I_q^*}{\sqrt{2}\,I_{x\_max}}\right) \tag{10}$$

$$I_v = \frac{I_q^*}{\sqrt{2}\cos\theta_2} = -I_{x\_max} \quad \therefore \theta_2 = \cos^{-1}\left(\frac{-I_q^*}{\sqrt{2}\,I_{x\_max}}\right) \tag{11}$$

if $I_q^* < 0$ $$I_v = \frac{I_q^*}{\sqrt{2}\cos\theta_1} = -I_{x\_max} \quad \therefore \theta_1 = \cos^{-1}\left(\frac{-I_q^*}{\sqrt{2}\,I_{x\_max}}\right) \tag{12}$$

$$I_v = \frac{I_q^*}{\sqrt{2}\cos\theta_2} = I_{x\_max} \quad \therefore \theta_2 = \cos^{-1}\left(\frac{I_q^*}{\sqrt{2}\,I_{x\_max}}\right) \tag{13}$$

The solutions of the expressions (10) to (13), or the rotation angles θ1, θ2, are represented by the inverse function of cos θ (arc cosine). Thus, the following equations are satisfied: cos(-θ)=cos θ; cos(θ+2π)=cos θ. Accordingly, using the following expressions (14) and (15), the other one of the predetermined rotation angles, the phase of which is offset from the phase of the rotation angle θA by 2π, is calculated. That is, the rotation angles θ3, θ4, which define the electric current restriction range in the proximity of the rotation angle θB, are obtained.

$$\theta_3 = 2\pi - \theta_2 \quad (14)$$

$$\theta_4 = 2\pi - \theta_1 \quad (15)$$

Similarly, if the phase with the failed electric current flow is the V phase (when the electric current flow in the V phase has failed), calculation is performed using the expressions (16), (17), (18), and (19), each obtained by substituting the upper limit value and the lower limit value of the phase current value into the above-described expression (6). In this manner, one of the rotation angles θA, θB corresponding to the asymptotic lines, which is the rotation angles θ1, θ2 defining the electric current restriction range in the proximity of the rotation angle θA, is obtained.

When the electric current flow fails in the V phase:

if $I_q^* \geq 0$ $$I_u = \frac{-I_q^*}{\sqrt{2}\sin(\theta_1 + \frac{\pi}{6})} = I_{x\_max} \quad (16)$$

$$\therefore \theta_1 = \sin^{-1}\left(\frac{-I_q^*}{\sqrt{2}\,I_{x\_max}}\right) + \frac{\pi}{6}$$

$$I_u = \frac{-I_q^*}{\sqrt{2}\sin(\theta_2 - \frac{\pi}{6})} = -I_{x\_max} \quad (17)$$

$$\therefore \theta_2 = \sin^{-1}\left(\frac{I_q^*}{\sqrt{2}\,I_{x\_max}}\right) + \frac{\pi}{6}$$

if $I_q^* < 0$ $$I_u = \frac{-I_q^*}{\sqrt{2}\sin(\theta_1 - \frac{\pi}{6})} = -I_{x\_max} \quad (18)$$

$$\therefore \theta_1 = \sin^{-1}\left(\frac{I_q^*}{\sqrt{2}\,I_{x\_max}}\right) + \frac{\pi}{6}$$

$$I_u = \frac{-I_q^*}{\sqrt{2}\sin(\theta_2 - \frac{\pi}{6})} = I_{x\_max} \quad (19)$$

$$\therefore \theta_2 = \sin^{-1}\left(\frac{-I_q^*}{\sqrt{2}\,I_{x\_max}}\right) + \frac{\pi}{6}$$

The solutions of the expressions (16) to (19), or the rotation angles θ1, θ2, are represented by the inverse function of sin θ (arc sine). Thus, based on the equation sin(π−θ)=sin θ, the following expressions (20) and (21) are satisfied for the relationship between the rotation angles θ1, θ2 defining the electric current restriction range in the proximity of the rotation angle θA and the other predetermined rotation angle the phase of which is offset from the phase of the rotation angle θA by 2π, or the rotation angles θ3, θ4 defining the electric current restriction range in the proximity of the rotation angle θB. By performing calculation using the expressions (20), (21), the other rotation angles θ3, θ4 are determined.

$$\pi - \left(\theta_2 - \frac{\pi}{6}\right) = \theta_3 - \frac{\pi}{6} \quad \therefore \theta_3 = \frac{4\pi}{3} - \theta_2 \quad (20)$$

$$\pi - \left(\theta_1 - \frac{\pi}{6}\right) = \theta_4 - \frac{\pi}{6} \quad \therefore \theta_4 = \frac{4\pi}{3} - \theta_1 \quad (21)$$

Further, if the phase with the failed electric current flow is the W phase (when the electric current flow in the W phase has failed), calculation is performed using the expressions (22), (23), (24), and (25), each obtained by substituting the upper limit value and the lower limit value of the phase current value into the above-described expression (9). In this manner, one of the rotation angles θA, θB corresponding to the asymptotic lines, which is the rotation angles θ3, θ4 defining the electric current restriction range in the proximity of the rotation angle θB, is obtained.

When the electric current flow fails in the W phase:

if $I_q^* \geq 0$ $$I_v = \frac{I_q^*}{\sqrt{2}\sin(\theta_4 + \frac{\pi}{6})} = I_{x\_max} \quad (22)$$

$$\therefore \theta_4 = \sin^{-1}\left(\frac{I_q^*}{\sqrt{2}\,I_{x\_max}}\right) - \frac{\pi}{6}$$

$$I_v = \frac{I_q^*}{\sqrt{2}\sin(\theta_3 + \frac{\pi}{6})} = -I_{x\_max} \quad (23)$$

$$\therefore \theta_3 = \sin^{-1}\left(\frac{-I_q^*}{\sqrt{2}\,I_{x\_max}}\right) - \frac{\pi}{6}$$

if $I_q^* < 0$ $$I_v = \frac{I_q^*}{\sqrt{2}\sin(\theta_4 + \frac{\pi}{6})} = -I_{x\_max} \quad (24)$$

$$\therefore \theta_4 = \sin^{-1}\left(\frac{-I_q^*}{\sqrt{2}\,I_{x\_max}}\right) - \frac{\pi}{6}$$

$$I_v = \frac{I_q^*}{\sqrt{2}\sin(\theta_3 + \frac{\pi}{6})} = I_{x\_max} \quad (25)$$

$$\therefore \theta_3 = \sin^{-1}\left(\frac{I_q^*}{\sqrt{2}\,I_{x\_max}}\right) - \frac{\pi}{6}$$

The solutions of the expressions (23) to (25), or the rotation angles θ3, θ4, are represented by the inverse function of sin θ (arc sine). Thus, based on the equation sin(π−θ)=sin θ, the following expressions (26) and (27) are satisfied for the relationship between the rotation angles θ3, θ4 defining the electric current restriction range in the proximity of the rotation angle θB and the other predetermined rotation angle the phase of which is offset from the phase of the rotation angle θB by 2π, or the rotation angles θ1, θ2 defining the electric current restriction range in the proximity of the rotation angle θA.

$$\pi - \left(\theta_3 + \frac{\pi}{6}\right) = \theta_2 + \frac{\pi}{6} \quad \therefore \theta_2 = \frac{2\pi}{3} - \theta_3 \quad (26)$$

$$\pi - \left(\theta_4 + \frac{\pi}{6}\right) = \theta_1 + \frac{\pi}{6} \quad \therefore \theta_1 = \frac{2\pi}{3} - \theta_4 \quad (27)$$

Through calculation using the expressions (26) and (27), the other rotation angles θ1, θ2 are determined.

In this manner, the determining section 31 computes the rotation angles θ1, θ2, θ3, θ4, which define the corresponding electric current restriction ranges in the proximities of the predetermined rotation angles θA, θB corresponding to the two asymptotic lines. If the detected rotation angle θ of the motor 12 falls in either one of the electric current restriction ranges (θ1<θ<θ2, θ3<θ<θ4), the determining section 31 determines the d-axis current command value Id* and the q-axis current command value Iq* in such a manner that the phase current values of the electric current flowing phases become constant at the upper limit value (Ix_max) or the lower limit value (−Ix_max).

Specifically, the determining section 31 calculates the d-axis current command value Id* and the q-axis current command value Iq* in correspondence with the identified phase with the failed electric current flow and the sign of the q-axis current command value Iq*, using the following expressions (28) to (51).

When the electric current flow fails in the U Phase:

if θ1<θ<π/2 or 3π/2<θ<θ4

$$I_d^* = \sqrt{2} I_{x\_max} \sin\theta \quad (I_q^* \geq 0) \tag{28}$$

$$I_d^* = \sqrt{2} I_{x\_max} \sin\theta \quad (I_q^* < 0) \tag{29}$$

$$I_q^* = \sqrt{2} I_{x\_max} \cos\theta \quad (I_q^* \geq 0) \tag{30}$$

$$I_q^* = -\sqrt{2} I_{x\_max} \cos\theta \quad (I_q^* < 0) \tag{31}$$

if π/2<θ<θ2 or θ3<θ<3π/2

$$I_d^* = -\sqrt{2} I_{x\_max} \sin\theta \quad (I_q^* \geq 0) \tag{32}$$

$$I_d^* = \sqrt{2} I_{x\_max} \sin\theta \quad (I_q^* < 0) \tag{33}$$

$$I_q^* = -\sqrt{2} I_{x\_max} \cos\theta \quad (I_q^* \geq 0) \tag{34}$$

$$I_q^* = \sqrt{2} I_{x\_max} \cos\theta \quad (I_q^* < 0) \tag{35}$$

When the electric current flow fails in the V phase:

if θ1 < θ < π/6 or 7π/6 < θ < θ4

$$I_d^* = I_{x\_max}\left(\sqrt{\frac{3}{2}} \cos\theta + \sqrt{\frac{1}{2}} \sin\theta\right) \quad (I_q^* \geq 0) \tag{36}$$

$$I_d^* = -I_{x\_max}\left(\sqrt{\frac{3}{2}} \cos\theta + \sqrt{\frac{1}{2}} \sin\theta\right) \quad (I_q^* < 0) \tag{37}$$

$$I_q^* = I_{x\_max}\left(-\sqrt{\frac{3}{2}} \sin\theta + \sqrt{\frac{1}{2}} \cos\theta\right) \quad (I_q^* \geq 0) \tag{38}$$

$$I_q^* = -I_{x\_max}\left(-\sqrt{\frac{3}{2}} \sin\theta + \sqrt{\frac{1}{2}} \cos\theta\right) \quad (I_q^* < 0) \tag{39}$$

if π/6 < θ < θ2 or θ3 < θ < 7π/6

$$I_d^* = -I_{x\_max}\left(\sqrt{\frac{3}{2}} \cos\theta + \sqrt{\frac{1}{2}} \sin\theta\right) \quad (I_q^* \geq 0) \tag{40}$$

$$I_d^* = I_{x\_max}\left(\sqrt{\frac{3}{2}} \cos\theta + \sqrt{\frac{1}{2}} \sin\theta\right) \quad (I_q^* < 0) \tag{41}$$

$$I_q^* = -I_{x\_max}\left(-\sqrt{\frac{3}{2}} \sin\theta + \sqrt{\frac{1}{2}} \cos\theta\right) \quad (I_q^* \geq 0) \tag{42}$$

$$I_q^* = I_{x\_max}\left(-\sqrt{\frac{3}{2}} \sin\theta + \sqrt{\frac{1}{2}} \cos\theta\right) \quad (I_q^* < 0) \tag{43}$$

When the electric current flow fails in the W phase:

if θ1 < θ < 5π/6 or 11π/6 < θ < θ4

$$I_d^* = I_{x\_max}\left(-\sqrt{\frac{3}{2}} \cos\theta + \sqrt{\frac{1}{2}} \sin\theta\right) \quad (I_q^* \geq 0) \tag{44}$$

$$I_d^* = -I_{x\_max}\left(-\sqrt{\frac{3}{2}} \cos\theta + \sqrt{\frac{1}{2}} \sin\theta\right) \quad (I_q^* < 0) \tag{45}$$

$$I_q^* = I_{x\_max}\left(\sqrt{\frac{3}{2}} \sin\theta + \sqrt{\frac{1}{2}} \cos\theta\right) \quad (I_q^* \geq 0) \tag{46}$$

$$I_q^* = -I_{x\_max}\left(\sqrt{\frac{3}{2}} \sin\theta + \sqrt{\frac{1}{2}} \cos\theta\right) \quad (I_q^* < 0) \tag{47}$$

if 5π/6 < θ < θ2 or θ3 < θ < 11π/6

$$I_d^* = -I_{x\_max}\left(-\sqrt{\frac{3}{2}} \cos\theta + \sqrt{\frac{1}{2}} \sin\theta\right) \quad (I_q^* \geq 0) \tag{48}$$

$$I_d^* = I_{x\_max}\left(-\sqrt{\frac{3}{2}} \cos\theta + \sqrt{\frac{1}{2}} \sin\theta\right) \quad (I_q^* < 0) \tag{49}$$

$$I_q^* = -I_{x\_max}\left(\sqrt{\frac{3}{2}} \sin\theta + \sqrt{\frac{1}{2}} \cos\theta\right) \quad (I_q^* \geq 0) \tag{50}$$

$$I_q^* = I_{x\_max}\left(\sqrt{\frac{3}{2}} \sin\theta + \sqrt{\frac{1}{2}} \cos\theta\right) \quad (I_q^* < 0) \tag{51}$$

In this manner, while ensuring the maximum motor output performance and stable and continuous control of the motor, an anomaly in the control system is detected with improved accuracy.

Figure 10:
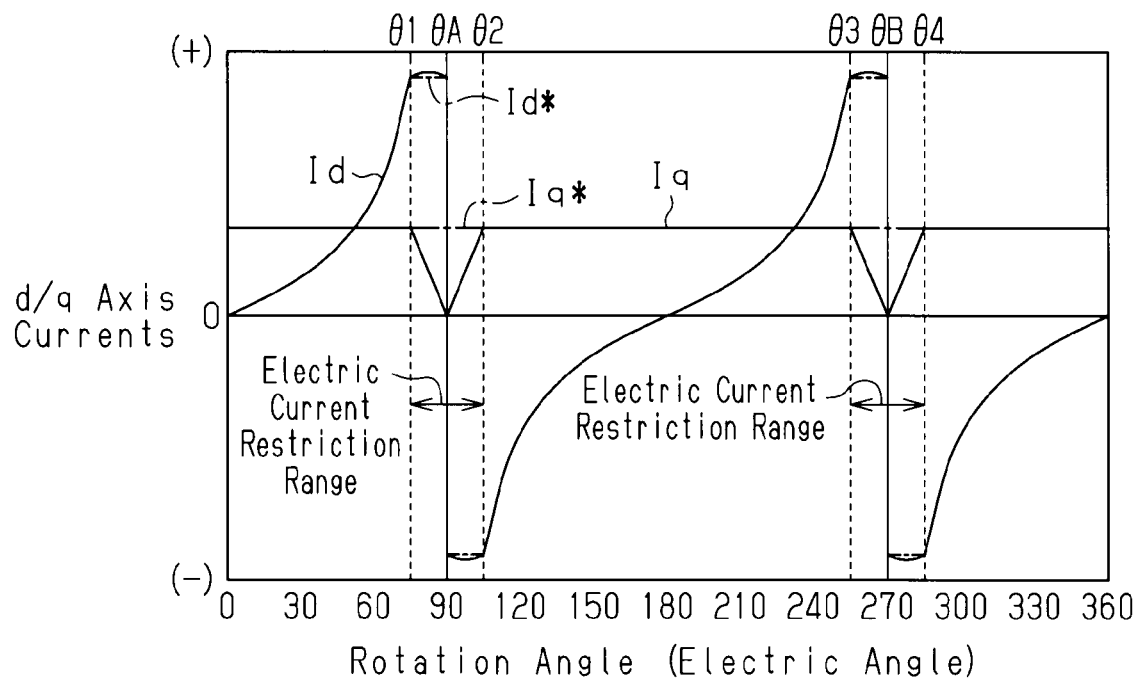
FIG. 10 is a graph representing changes of d/q axis currents in the current feedback control performed with a d-axis current command value Id* and a q-axis current command value Iq* maintained constant in electric current restriction ranges, when the electric current flow has failed (in the U phase)
Figure 11:
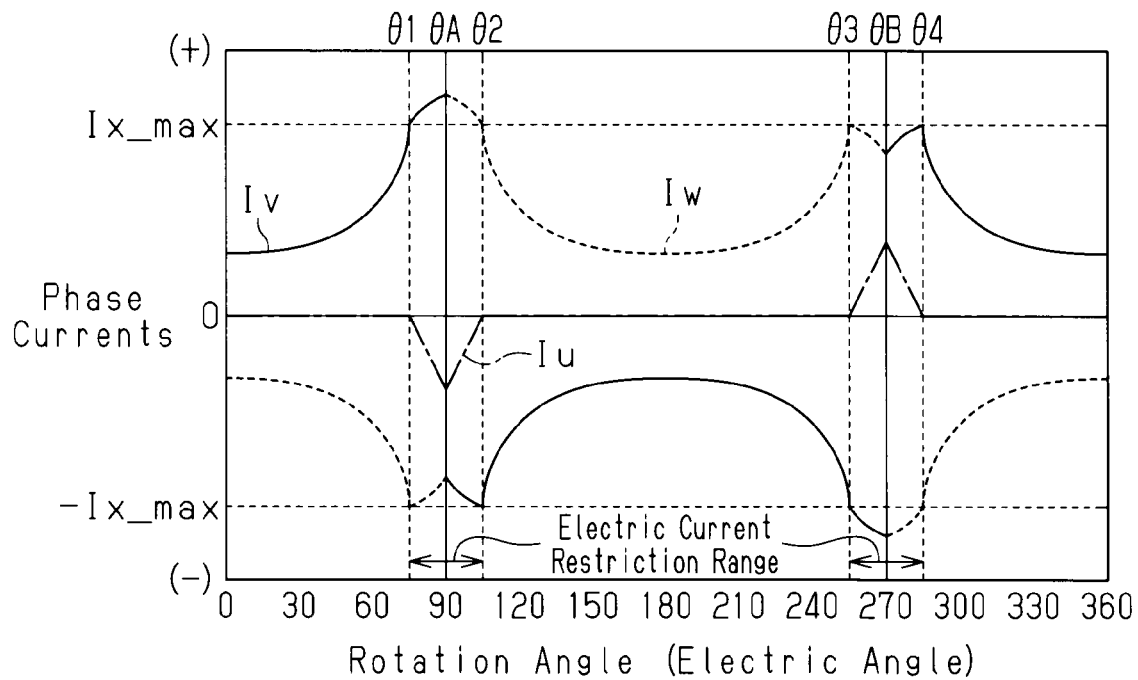
FIG. 11 is a graph representing changes of the phase currents in the current feedback control using the d-axis electric command value for when the electric current flow in the U phase fails, despite that there is no such failure of the electric current flow.
Figure 12:
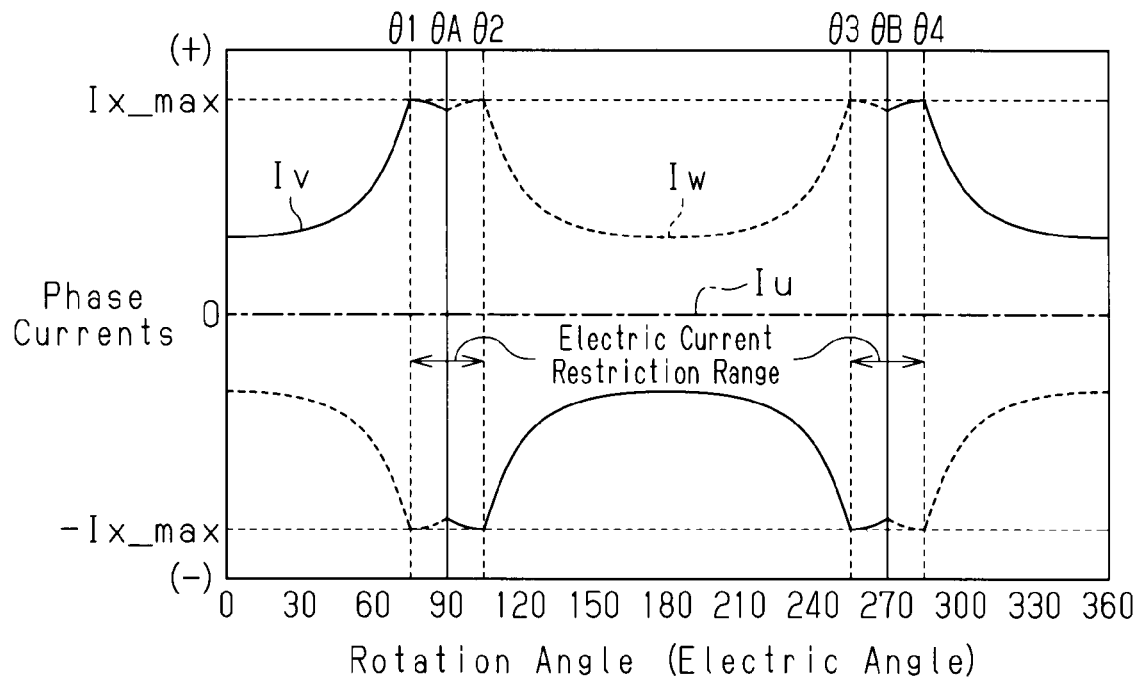
FIG. 12 is a graph representing changes of the phase currents in the current feedback control performed with the d-axis current command value Id* and the q-axis current command value Iq* maintained constant in the electric current restriction ranges, when the electric current flow (in the U phase) has failed.

Specifically, with reference to FIG. 10, simply through the current feedback control with the d-axis current command value Id* and the q-axis current command value Iq* maintained constant in the respective electric current restriction ranges (θ1<θ<θ2, θ3<θ<θ4), the d-axis current Id does not follow the d-axis current command value Id*. FIG. 10 illustrates an example when the electric current flow in the U phase has failed. In other words, in a normal state (when normal electric current flows are ensured in the respective phases), the phase currents flow in the phases of the motor as illustrated in FIG. 11. The d-axis current value Id thus follows the d-axis current command value Id*. Contrastingly, if the electric current flow in any one of the phases fails and the two-phase drive operation is performed, the electric current value of the phase with the failed electric current flow becomes "0". In this state, the phase current values of the electric current flowing phases represent the waveforms illustrated in FIG. 12. As a result, the d-axis current value Id does not follow the d-axis current command value Id*. The output of the motor 12 thus cannot be maximized.

However, by carrying out the current feedback control based on the d-axis current command value Id* and the q-axis current command value Iq* determined by the expressions (28) to (51), the d-axis current value Id and the q-axis current value Iq become values that follow the d-axis current command value Id* and q-axis current command value Iq*, respectively, in the above-described electric current restriction ranges. That is, the phase current values of the electric current flowing phases in the electric current restriction ranges become constant at the upper limit value (Ix_max) or the lower limit value (−Ix_max). This ensures the maximum output performance of the motor.

Further, by determining in advance the q-axis current command value Iq* in such a range that the q-axis current value Id is capable of following a value corresponding to the q-axis current command value Iq*, reliability of anomaly detection based on the q-axis current deviation ΔIq is ensured in the electric current restriction ranges. As a result, in the two-phase drive operation, the anomaly detection in the control system is carried out with enhanced accuracy.

Next, a procedure for performing the above-described anomaly detection and switching the control modes using the microcomputer will be explained, along with a procedure for generating a motor control signal.

Figure 13:
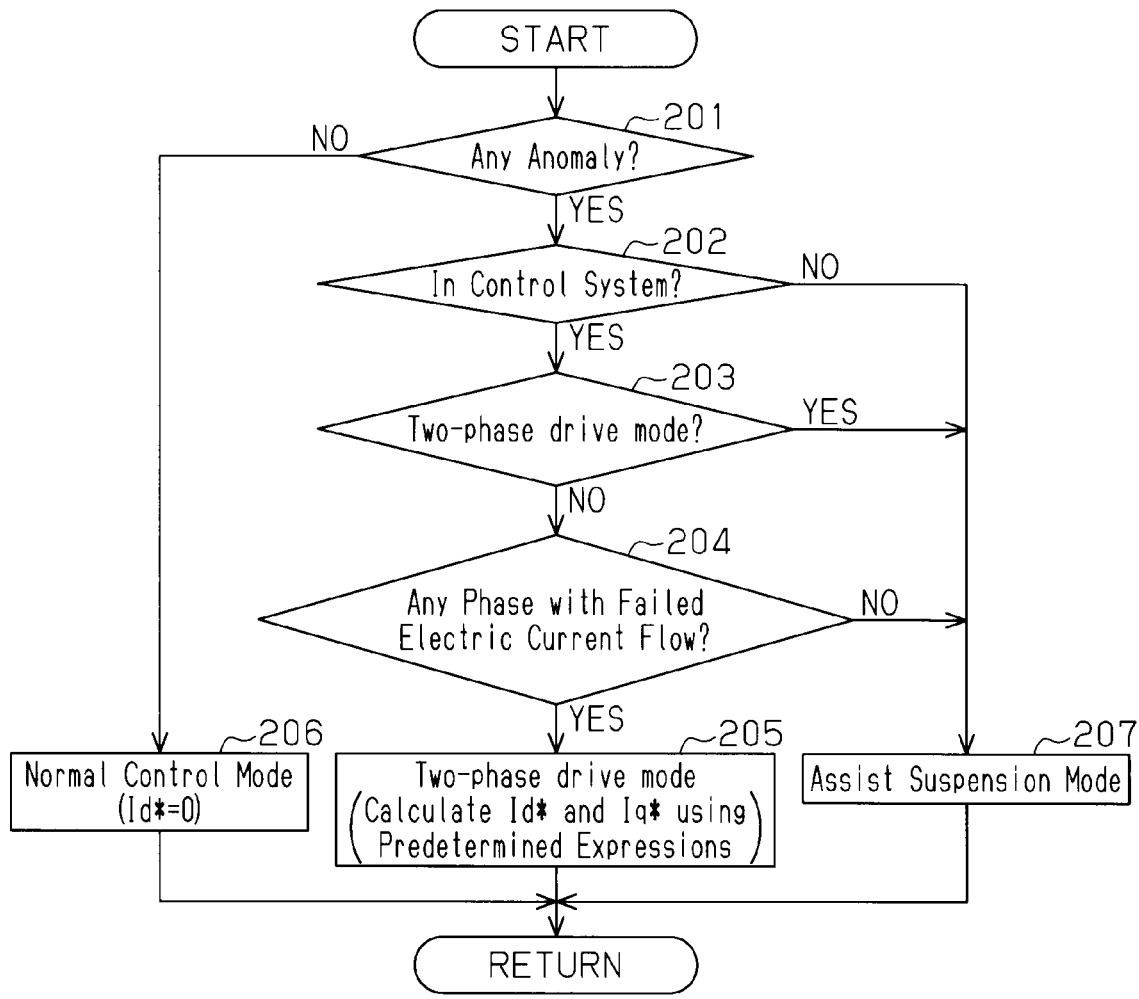
FIG. 13 is a flowchart representing a procedure for determining whether there is an anomaly and switching control modes.

With reference to the flowchart of FIG. 13, the microcomputer 17 first determines whether any anomaly has occurred (step 201). If it is determined that an anomaly has occurred (step 201: YES), the microcomputer 17 determines whether the anomaly has occurred in the control system (step 202). If it is determined that the anomaly is in the control system (step 202: YES), the microcomputer 17 determines whether the current control mode is the two-phase drive mode (step 203). If the current control mode is not the two-phase drive mode (step 203: NO), the microcomputer 17 determines whether the anomaly of the control system corresponds to a failure of an electric current flow in any one of the phases (step 204). If it is determined that the failure of the electric current flow has occurred in any one of the phase (step 204: YES), the microcomputer 17 outputs a motor control signal instructing to use the other two of the phases other than the phase with the failed electric current flow as the electric current flowing phases (the two-phase drive mode, step 205).

In step 205, as has been described, the microcomputer 17 computes the d-axis current command value Id* and the q-axis current command value Iq* in correspondence with the identified phase with the failed electric current flow and depending on whether the detected rotation angle θ falls in either one of the electric current restriction ranges (θ1<θ<θ2, θ3<θ<θ4).

Figure 14:
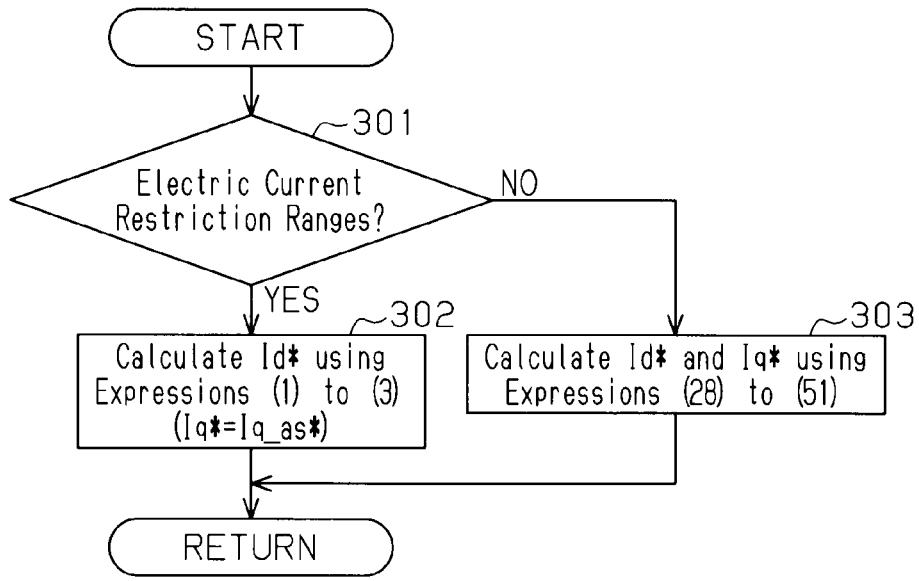
FIG. 14 is a flowchart representing a procedure for calculating the d-axis current command value Id* and the q-axis current command value Iq* in the electric current restriction ranges.
Figure 15:
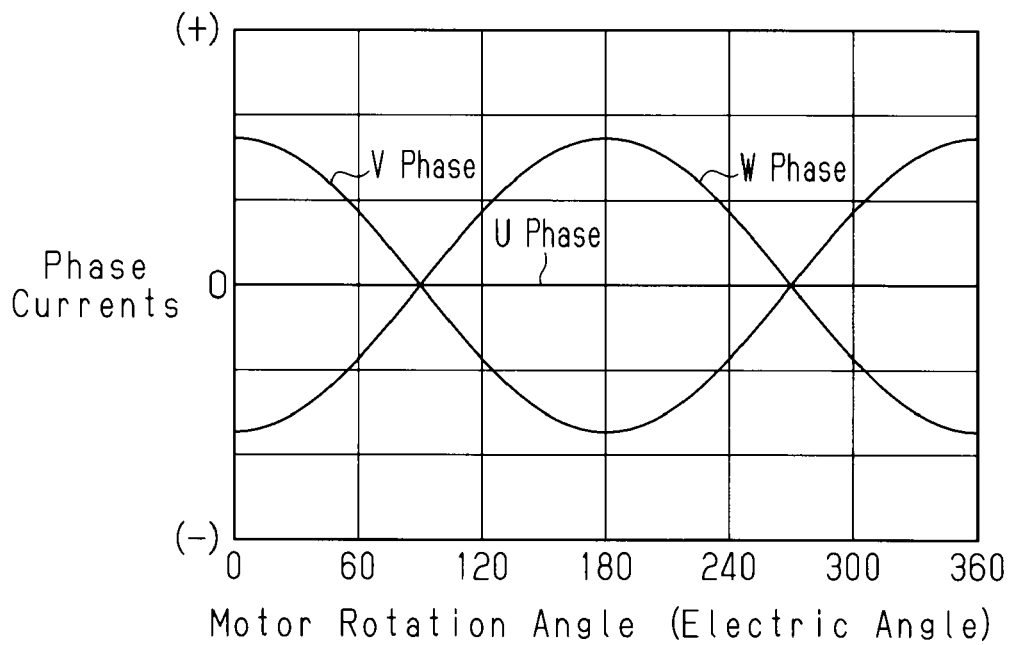
FIG. 15 is a graph illustrating conventional two-phase drive operation in which two phases other than a phase with a failed electric current flow are used as electric current flowing phases.
Figure 16:
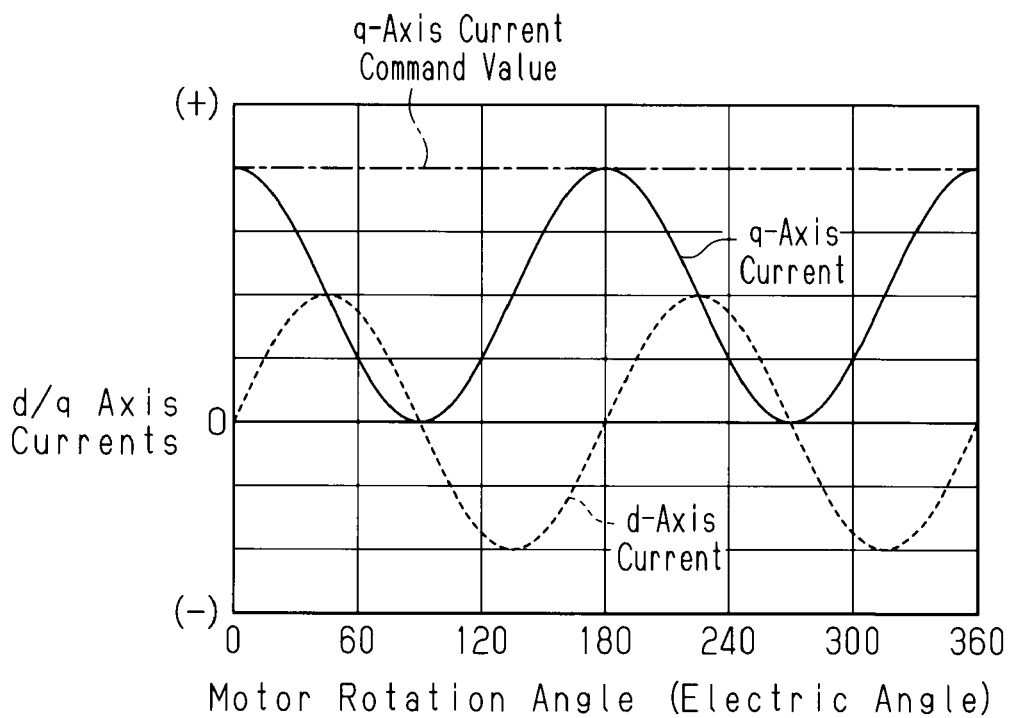
FIG. 16 is a graph representing changes of a d-axis current and a q-axis current in the conventional two-phase drive operation.

Specifically, as represented in the flowchart of FIG. 14, the microcomputer 17 determines whether the detected rotation angle θ is in the electric current restriction range (step 301). If the rotation angle θ is outside the electric current restriction range (step 301: NO), the microcomputer 17 calculates the d-axis current command value Id* using the expressions (1) to (3) (step 302). In this case, the microcomputer 17 calculates the same value as the q-axis current command value Iq* for the normal state (when normal electric current flows are ensured in the phases), or the original value corresponding to the target value of the motor torque (Iq*=Iq_as*).

If the detected rotation angle θ falls in the electric current restriction range (step 301: YES), the microcomputer 17 calculates the d-axis current command value Id* and the q-axis current command value Iq* using the expressions (28) to (51) (step 303).

Contrastingly, if it is determined that there is no anomaly in step 201 (step 201: NO), the microcomputer 17 outputs the motor control signal for the normal state (Id*=0, the normal control mode, step 206). If it is determined that the anomaly has occurred outside the control system (step 202: NO), that the current control mode is the two-phase drive mode (step 203: YES), or that the anomaly is other than a failure of an electric current flow in any one of the phases (step 204: NO), the microcomputer 17 switches to the assist suspension mode (step 207). The microcomputer 17 then outputs a motor control signal instructing to stop the operation of the motor 12 and opens the power source relay.

The illustrated embodiment has the following advantages.

If there is any phase with a failed electric current flow, the microcomputer 17 calculates the d-axis current command value Id* that changes along a tangent curve with the predetermined rotation angles θA, θB as the asymptotic lines. The microcomputer 17 then performs the current feedback control based on the d-axis current command value Id* and thus continuously outputs the motor control signal using the two phases other than the phase with the failed electric current flow as the electric current flowing phases. In the two-phase drive operation, the microcomputer 17 calculates the d-axis current command value Id* and the q-axis current command value Iq* in such a manner that the phase current values of the electric current flowing phases become constant at the maximum values set for the respective phases in the ranges of the rotation angles in which the phase current values are to be restricted in correspondence with the maximum values, or the electric current restriction ranges (θ1<θ<θ2, θ3<θ<θ4).

In this manner, except for the electric current restriction ranges (θ1<θ<θ2, θ3<θ<θ4) in the proximities of the predetermined rotation angles θA, θB corresponding to the asymptotic lines, the motor electric current (the q-axis current value Iq) corresponding to the requested torque (the q-axis current command value Iq*) is generated. As a result, even if the electric current flow in any one of the phases fails, generation of a torque ripple is suppressed. Thus, while maintaining improved steering comfort, the assist force is continuously applied. Further, by maintaining the phase current values of the electric current flowing phases constant at the upper limit value (Ix_max) or the lower limit value (−Ix_max) in the electric current restriction ranges, the maximum output performance of the motor is ensured. Also, by determining, in advance, the q-axis current command value Iq* that can be achieved by the q-axis current value Iq, reliability of the anomaly detection based on the q-axis current deviation ΔIq is ensured in the electric current restriction ranges. As a result, even in the two-phase drive operation, an anomaly in the control system is detected with enhanced accuracy.

The illustrated embodiment may be modified in the following forms.

Although the present invention is embodied as the electric power steering apparatus (EPS) in the illustrated embodiment, the invention may be embodied as a motor controller used for purposes other than use in the EPS.

In the illustrated embodiment, the ECU 11, or the motor controller, operates in accordance with the three modes, which are the "normal control mode", "the assist suspension mode", and the "two-phase drive mode". However, the control modes for when an anomaly occurs are not restricted to these three modes. That is, as long as the operation of the motor is controlled with two phases other than the phase with a failed electric current flow as electric current flowing phases, any suitable motor controller may be employed. Further, a method for detecting an anomaly other than the method of the illustrated embodiment may be used.

The d-axis current command value Id*, which is calculated in the two-phase drive operation, does not necessarily have to be exactly equal to the value obtained from the expressions (1) to (3). However, if the d-axis current command value Id* is determined using the expressions (1) to (3), the q-axis current value Iq is generated as a value maximally close to the q-axis current command value Iq*. The closer the generated value to the d-axis current command value Id*, which is determined by the expressions, the more pronounced the obtained effect becomes.

In the illustrated embodiment, detection of an anomaly in the control system is performed based on the q-axis current deviation ΔIq according to the present invention. However, as long as such anomaly detection is carried out based on an electric current deviation of a d-q coordinate system, the detection may be performed based on the d-axis current deviation ΔId or a resultant vector deviation of the d/q coordinate system.

The invention claimed is:

1. A motor controller comprising:
signal output means that outputs a motor control signal; and
a driver circuit that supplies a three-phase drive power to a motor based on the motor control signal,
wherein the signal output means includes calculating means that calculates a d-axis current command value and a q-axis current command value of a d/q coordinate system as electric current command values, signal generating means that generates the motor control signal by performing current feedback control of the d/q coordinate system based on the d-axis current command value and the q-axis current command value, and anomaly detecting means that is capable of detecting a failed electric current flow in any one of the phases of the motor,
wherein, when a failed electric current flow is detected, the signal output means outputs the motor control signal using two phases other than the phase with the failed electric current flow as electric current flowing phases,
wherein a maximum value of an electric current flowable in each of the phases of the motor is set for each of phase current values of the motor, and
wherein, when a failed electric current flow occurs, the calculating means calculates the d-axis current command value changing along a tangent curve with a predetermined rotation angle corresponding to the phase with the failed electric current flow as an asymptotic line, and calculates the d-axis current command value and the q-axis current command value in such a manner that the phase current value of each of the electric current flowing phases becomes constant at the maximum value in a rotating angle range in which the phase current value needs to be restricted based on the maximum value.

2. The motor controller according to claim 1, wherein, when a failed electric current flow occurs, the calculating means calculates the d-axis current command value in correspondence with the phase with the failed electric current flow using the following expressions:

When the electric current flow fails in the U phase:

$$I_d^* = I_q^* \frac{\sin\theta}{\cos\theta} = I_q^* \tan\theta$$

When the electric current flow fails in the V phase:

$$I_d^* = -I_q^* \frac{\sin\left(\theta + \frac{\pi}{3}\right)}{\sin\left(\theta - \frac{\pi}{6}\right)} = I_q^* \tan\left(\theta - \frac{2\pi}{3}\right)$$

When the electric current flow fails in the W Phase:

$$I_d^* = -I_q^* \frac{\sin\left(\theta + \frac{2\pi}{3}\right)}{\sin\left(\theta + \frac{\pi}{6}\right)} = I_q^* \tan\left(\theta + \frac{2\pi}{3}\right)$$

(θ: rotation angle, Id*: d-axis current command value, Iq*: q-axis current command value), and
wherein the calculating means calculates the d-axis current command value and the q-axis current command value in the rotation angle range in which the phase currents need be restricted, using the following expressions:

When the electric current flow fails in the U Phase:

if $\theta_1 < \theta < \pi/2$ or $3\pi/2 < \theta < \theta_4$ $I_d^* = \sqrt{2} \, I_{x\_max} \sin\theta \quad (I_q^* \geq 0)$
$I_d^* = -\sqrt{2} \, I_{x\_max} \sin\theta \quad (I_q^* < 0)$
$I_q^* = \sqrt{2} \, I_{x\_max} \cos\theta \quad (I_q^* \geq 0)$
$I_q^* = -\sqrt{2} \, I_{x\_max} \cos\theta \quad (I_q^* < 0)$ if $\pi/2 < \theta < \theta_2$ or $\theta_3 < \theta < 3\pi/2$ $I_d^* = -\sqrt{2} \, I_{x\_max} \sin\theta \quad (I_q^* \geq 0)$
$I_d^* = \sqrt{2} \, I_{x\_max} \sin\theta \quad (I_q^* < 0)$
$I_q^* = -\sqrt{2} \, I_{x\_max} \cos\theta \quad (I_q^* \geq 0)$
$I_q^* = \sqrt{2} \, I_{x\_max} \cos\theta \quad (I_q^* < 0)$ provided that:

$\theta_1 = \cos^{-1}\left(\frac{I_q^*}{\sqrt{2} \, I_{x\_max}}\right) \quad (I_q^* \geq 0)$ $\quad\quad \cos^{-1}\left(\frac{-I_q^*}{\sqrt{2} \, I_{x\_max}}\right) \quad (I_q^* < 0)$ $\theta_2 = \cos^{-1}\left(\frac{-I_q^*}{\sqrt{2} \, I_{x\_max}}\right) \quad (I_q^* \geq 0)$ $\quad\quad \cos^{-1}\left(\frac{I_q^*}{\sqrt{2} \, I_{x\_max}}\right) \quad (I_q^* < 0)$ $\theta_3 = 2\pi - \theta_2$
$\theta_4 = 2\pi - \theta_1$ When the electric current flow fails in the V Phase:

if $\theta_1 < \theta < \pi/6$ or $7\pi/6 < \theta < \theta_4$

-continued $$I_d^* = I_{x\_max}\left(\sqrt{\frac{3}{2}}\cos\theta + \sqrt{\frac{1}{2}}\sin\theta\right) \quad (I_q^* \geq 0)$$

$$I_d^* = -I_{x\_max}\left(\sqrt{\frac{3}{2}}\cos\theta + \sqrt{\frac{1}{2}}\sin\theta\right) \quad (I_q^* < 0)$$

$$I_q^* = I_{x\_max}\left(-\sqrt{\frac{3}{2}}\sin\theta + \sqrt{\frac{1}{2}}\cos\theta\right) \quad (I_q^* \geq 0)$$

$$I_q^* = -I_{x\_max}\left(-\sqrt{\frac{3}{2}}\sin\theta + \sqrt{\frac{1}{2}}\cos\theta\right) \quad (I_q^* < 0)$$

if $\pi/6 < \theta < \theta 2$ or $\theta 3 < \theta < 7\pi/6$ $$I_d^* = -I_{x\_max}\left(\sqrt{\frac{3}{2}}\cos\theta + \sqrt{\frac{1}{2}}\sin\theta\right) \quad (I_q^* \geq 0)$$

$$I_d^* = I_{x\_max}\left(\sqrt{\frac{3}{2}}\cos\theta + \sqrt{\frac{1}{2}}\sin\theta\right) \quad (I_q^* < 0)$$

$$I_q^* = -I_{x\_max}\left(-\sqrt{\frac{3}{2}}\sin\theta + \sqrt{\frac{1}{2}}\cos\theta\right) \quad (I_q^* \geq 0)$$

$$I_q^* = I_{x\_max}\left(-\sqrt{\frac{3}{2}}\sin\theta + \sqrt{\frac{1}{2}}\cos\theta\right) \quad (I_q^* < 0)$$

provided that:

$$\theta_1 = \sin^{-1}\left(\frac{-I_q^*}{\sqrt{2}\,I_{x\_max}}\right) + \frac{\pi}{6} \quad (I_q^* \geq 0)$$

$$\sin^{-1}\left(\frac{I_q^*}{\sqrt{2}\,I_{x\_max}}\right) + \frac{\pi}{6} \quad (I_q^* < 0)$$

$$\theta_2 = \sin^{-1}\left(\frac{I_q^*}{\sqrt{2}\,I_{x\_max}}\right) + \frac{\pi}{6} \quad (I_q^* \geq 0)$$

$$\sin^{-1}\left(\frac{-I_q^*}{\sqrt{2}\,I_{x\_max}}\right) + \frac{\pi}{6} \quad (I_q^* < 0)$$

$$\theta_3 = \frac{4\pi}{3} - \theta_2$$

$$\theta_4 = \frac{4\pi}{3} - \theta_1$$

When the electric current flow fails in the W phase:

if $\theta 1 < \theta < 5\pi/6$ or $11\pi/6 < \theta < \theta 4$

-continued $$I_d^* = I_{x\_max}\left(-\sqrt{\frac{3}{2}}\cos\theta + \sqrt{\frac{1}{2}}\sin\theta\right) \quad (I_q^* \geq 0)$$

$$I_d^* = -I_{x\_max}\left(-\sqrt{\frac{3}{2}}\cos\theta + \sqrt{\frac{1}{2}}\sin\theta\right) \quad (I_q^* < 0)$$

$$I_q^* = I_{x\_max}\left(\sqrt{\frac{3}{2}}\sin\theta + \sqrt{\frac{1}{2}}\cos\theta\right) \quad (I_q^* \geq 0)$$

$$I_q^* = -I_{x\_max}\left(\sqrt{\frac{3}{2}}\sin\theta + \sqrt{\frac{1}{2}}\cos\theta\right) \quad (I_q^* < 0)$$

if $5\pi/6 < \theta < \theta 2$ or $\theta 3 < \theta < 11\pi/6$ $$I_d^* = -I_{x\_max}\left(-\sqrt{\frac{3}{2}}\cos\theta + \sqrt{\frac{1}{2}}\sin\theta\right) \quad (I_q^* \geq 0)$$

$$I_d^* = I_{x\_max}\left(-\sqrt{\frac{3}{2}}\cos\theta + \sqrt{\frac{1}{2}}\sin\theta\right) \quad (I_q^* < 0)$$

$$I_q^* = -I_{x\_max}\left(\sqrt{\frac{3}{2}}\sin\theta + \sqrt{\frac{1}{2}}\cos\theta\right) \quad (I_q^* \geq 0)$$

$$I_q^* = I_{x\_max}\left(\sqrt{\frac{3}{2}}\sin\theta + \sqrt{\frac{1}{2}}\cos\theta\right) \quad (I_q^* < 0)$$

provided that:

$$\theta_4 = \sin^{-1}\left(\frac{I_q^*}{\sqrt{2}\,I_{x\_max}}\right) - \frac{\pi}{6} \quad (I_q^* \geq 0)$$

$$\sin^{-1}\left(\frac{-I_q^*}{\sqrt{2}\,I_{x\_max}}\right) - \frac{\pi}{6} \quad (I_q^* < 0)$$

$$\theta_3 = \sin^{-1}\left(\frac{-I_q^*}{\sqrt{2}\,I_{x\_max}}\right) - \frac{\pi}{6} \quad (I_q^* \geq 0)$$

$$\sin^{-1}\left(\frac{I_q^*}{\sqrt{2}\,I_{x\_max}}\right) - \frac{\pi}{6} \quad (I_q^* < 0)$$

$$\theta_2 = \frac{2\pi}{3} - \theta_3$$

$$\theta_1 = \frac{2\pi}{3} - \theta_4$$

(Id*: d-axis current command value, Iq*: q-axis current command value, Ix_max: maximum value of flowable electric current).

3. An electric power steering apparatus having the motor controller according to claim 1.

* * * * *